US012792307B2

(12) United States Patent
Willcock

(10) Patent No.: US 12,792,307 B2
(45) Date of Patent: Nov. 10, 2026

(54) SYSTOLIC ARRAY CELLS WITH MULTIPLE ACCUMULATORS

(71) Applicant: Google LLC, Mountain View, CA (US)

(72) Inventor: Jeremiah Willcock, Santa Clara, CA (US)

(73) Assignee: Google LLC, Mountain View, CA (US)

( * ) Notice: Subject to any disclaimer, the term of this patent is extended or adjusted under 35 U.S.C. 154(b) by 1170 days.

(21) Appl. No.: 17/538,101

(22) Filed: Nov. 30, 2021

(65) Prior Publication Data

US 2022/0171605 A1 Jun. 2, 2022

Related U.S. Application Data

(60) Provisional application No. 63/119,556, filed on Nov. 30, 2020.

(51) Int. Cl.
*G06F 7/544* (2006.01)
*G06F 17/16* (2006.01)

(52) U.S. Cl.
CPC ............ *G06F 7/5443* (2013.01); *G06F 17/16* (2013.01); *G06F 2207/3892* (2013.01)

(58) Field of Classification Search
CPC ............. G06F 17/16; G06F 2207/3892; G06F 15/8046; G06F 7/5443
See application file for complete search history.

(56) References Cited

U.S. PATENT DOCUMENTS 10,915,297 B1 * 2/2021 Halutz .................. G06F 17/153
11,842,169 B1 * 12/2023 Elmer ................. G06F 15/8046
2018/0046900 A1 * 2/2018 Dally .................. G06F 9/30018
2019/0004794 A1 1/2019 Raghavan et al.
2019/0012295 A1 * 1/2019 Yinger .................. G06F 7/5443
2020/0226444 A1 * 7/2020 Sharma .................... G06N 3/08
(Continued)

FOREIGN PATENT DOCUMENTS

CN 111652360 9/2020
IN 548149 8/2024
JP 2014-199545 10/2014
(Continued)

OTHER PUBLICATIONS

K. Bernstein and A. Furman, "Multiport Register File Architecture," 1984 Symposium on VLSI Technology. Digest of Technical Papers, San Diego, CA, USA, 1984, pp. 48-49 (Year: 1984).*
(Continued)

*Primary Examiner* — Emily E Larocque
*Assistant Examiner* — Jerome Anthony Klosterman, II
(74) *Attorney, Agent, or Firm* — Fish & Richardson P.C.

(57) ABSTRACT

This specification describes systolic arrays of hardware processing units. In one aspect, a matrix computation unit includes multiple cells arranged in a systolic array. Each cell includes multiplication circuitry configured to determine a product of elements or submatrices of input matrices, summation circuitry configured to determine a sum of an input accumulated value and the product output by the multiplication circuitry, multiple accumulators connected to an output of the summation circuitry, and a controller circuit configured to select, from the accumulators, a given accumulator to receive the sum output by the summation circuitry.

20 Claims, 4 Drawing Sheets

(56) References Cited

U.S. PATENT DOCUMENTS

| | | | | |
|---|---|---|---|---|
| 2020/0334322 | A1* | 10/2020 | Liu | G06F 17/16 |
| 2022/0012303 | A1* | 1/2022 | Zheng | G06F 17/16 |

FOREIGN PATENT DOCUMENTS

| | | |
|---|---|---|
| JP | 2018-092559 | 6/2018 |
| JP | 2020-500365 | 1/2020 |
| JP | 2021-082289 | 5/2021 |
| KR | 10-2020-0045006 | 4/2020 |
| KR | 10-2020-0070088 | 6/2020 |
| WO | WO 2018080624 | 5/2018 |
| WO | WO 2018228703 | 12/2018 |
| WO | WO 2020190808 | 9/2020 |

OTHER PUBLICATIONS

Ryan Kendrick and Michael Moukarzel, "Sparse Matrix Multiplication on a Field-Programmable Gate Array" Worcester Polytechnic institute, 2007 (Year: 2007).*

Notice of Allowance in Japanese Appln. No. 2022-570187, mailed on Oct. 1, 2024, 5 pages (with English translation).

International Preliminary Report on Patentability in International Appln. No. PCT/US2021/061198, mailed on Jun. 15, 2023, 9 pages.

Office Action in Japanese Appln. No. 2022-570187, mailed on Mar. 19, 2024, 20 pages (with English translation).

Deng et al., "PermDNN: Efficient Compressed DNN Architecture with Permuted Diagonal Matrices," 2018 51st Annual IEEE/ACM International Symposium on Microarchitecture, Oct. 20, 2018, pp. 189-202.

International Search Report and Written Opinion in International Appln. No. PCT/US2021/061198, dated Mar. 22, 2022, 15 pages.

Kung et al., "Packing sparse convolutional neural networks for efficient systolic aray implementations: Column combining under joint optimization," Proceedings of the 24th ACM Int Conf on Architectural Support for Programming Languages and Operating Systems, Apr. 2019, 14 pages.

Kung et al., "Wavefront Array Processor: Language, Architecture, and Applications," IEEE Transactions on Computers, Nov. 1982, 31(11):1054-1066.

Office Action in European Appln. No. 21831404.5, mailed on Jul. 16, 2025, 8 pages.

Office Action in Korean Appln. No. 10-2022-7039598, mailed on May 27, 2025, 17 pages (with English translation).

Notice of Allowance in Korean Appln. No. 10-2022-7039598, mailed on Jan. 29, 2026, 4 pages (with English translation).

Office Action in Chinese Appln, No. 202180035151.9, mailed on Feb. 3, 2026, 18 pages (with English translation).

* cited by examiner

SYSTOLIC ARRAY CELLS WITH MULTIPLE ACCUMULATORS

CROSS-REFERENCE TO RELATED APPLICATIONS

This application claims the benefit under 35 U.S.C. § 119(e) of U.S. Patent Application No. 63/119,556, filed Nov. 30, 2020. The disclosure of the foregoing application is incorporated herein by reference in its entirety for all purposes.

TECHNICAL FIELD

This specification relates to systolic arrays of hardware processing units.

BACKGROUND

A systolic array is a network of processing units that compute and pass data through the network. The data in the systolic array flows between the processing units in a pipelined manner and each processing unit can independently compute a partial result based on data received from its upstream neighboring processing units. The processing units, which can also be referred to as cells, can be hardwired together to pass data from upstream processing units to downstream processing units. Systolic arrays are used in machine learning applications, e.g., to perform matrix multiplications.

SUMMARY

In general, one innovative aspect of the subject matter described in this specification can be embodied in matrix computation unit that includes multiple cells arranged in a systolic array. Each cell includes multiplication circuitry configured to determine a product of elements or submatrices of input matrices, summation circuitry configured to determine a sum of an input accumulated value and the product output by the multiplication circuitry, multiple accumulators connected to an output of the summation circuitry, and a controller circuit configured to select, from the multiple accumulators, a given accumulator to receive the sum output by the summation circuitry.

These and other implementations can each optionally include one or more of the following features. In some aspects, the controller circuit is configured to select the given accumulator for each of multiple products determined by the multiplication circuitry based on selector data received by the cell.

In some aspects, each cell includes a first input register configured to receive a first submatrix and a second input register configured to receive a second submatrix and the product determined by the multiplication circuitry includes a product of the first submatrix and the second submatrix. Each cell further can include one or more selector registers configured to receive selector data. The controller circuit can be configured to select the given accumulator for each of multiple products determined by the multiplication circuitry based on the selector data.

In some aspects, the selector data can include data defining a sparsity pattern of the first submatrix that indicates a position of a non-zero element within the first submatrix. The selector data can include data defining a sparsity pattern of the second submatrix that indicates a position of a non-zero element within the second submatrix.

In some aspects, the selector data can indicate a first sub-multiplication to which the first submatrix belongs. The selector data can indicate a second sub-multiplication to which the second submatrix belongs. When the first sub-multiplication matches the second sub-multiplication, the controller circuit can be configured to select the given accumulator corresponding to the first sub-multiplication and the second sub-multiplication. When the first sub-multiplication does not match the second sub-multiplication, the controller can be configured to disable a write input to all of the plurality of accumulators.

In some aspects, each accumulator accumulates values output by the summation circuitry for a given set of input matrices.

In general, another innovative aspect of the subject matter described in this specification can be embodied in a data processing cell. The data processing cell can include multiplication circuitry configured to determine a product of submatrices of input matrices, summation circuitry configured to determine a sum of an input accumulated value and the product output by the multiplication circuitry, multiple accumulators connected to an output of the summation circuitry, and a controller circuit configured to select, from the multiple accumulators, a given accumulator to receive the sum output by the summation circuitry.

These and other implementations can each optionally include one or more of the following features. In some aspects, the controller circuit is configured to select the given accumulator for each of multiple products determined by the multiplication circuitry based on selector data received by the data processing cell.

In some aspects, the data processing cell includes a first input register configured to receive a first submatrix and a second input register configured to receive a second submatrix. The product determined by the multiplication circuitry includes a product of the first submatrix and the second submatrix. The data processing cell can include one or more selector registers configured to receive selector data. The controller circuit can be configured to select the given accumulator for each of multiple products determined by the multiplication circuitry based on the selector data.

In some aspects, the selector data includes data defining a sparsity pattern of the first submatrix that indicates a position of a non-zero element within the first submatrix. The selector data can include data defining a sparsity pattern of the second submatrix that indicates a position of a non-zero element within the second submatrix.

In some aspects, the selector data indicates a first sub-multiplication to which the first submatrix belongs. The selector data can indicate a second sub-multiplication to which the second submatrix belongs. When the first sub-multiplication matches the second sub-multiplication, the controller can be configured to select the given accumulator corresponding to the first sub-multiplication and the second sub-multiplication. When the first sub-multiplication does not match the second sub-multiplication, the controller can be configured to disable a write input to all of the plurality of accumulators.

In some aspects, each accumulator of the multiple accumulators accumulates values output by the summation circuitry for a given set of input matrices.

These and other implementations can each optionally include one or more of the following features. In some aspects, a method for multiplying matrices includes receiving, by a first input register of a cell, a first input submatrix; receiving, by a second input register of the cell, a second input submatrix; selecting, by a controller of the cell, a given accumulator from multiple accumulators of the cell to receive a sum of (i) a product of the first input submatrix and the second input submatrix and (ii) a current accumulated value of the given accumulator; generating, by multiplication circuitry of the cell, a product of the first input matrix and the second input matrix; generating, by summation circuitry of the cell, an updated accumulated value by adding the product of the first input matrix and the second input matrix to the current accumulated value; and storing the updated accumulated value in the given accumulator.

These and other implementations can each optionally include one or more of the following features. In some aspects, the product determined by the multiplication circuitry includes a product of the first submatrix and the second submatrix. Some aspects include receiving, by one or more selector registers of the cell, selector data. Selecting the given accumulator can include selecting the given accumulator based on the selector data.

In some aspects, the selector data includes data defining a sparsity pattern of the first input submatrix that indicates a position of a non-zero element within the first submatrix. The selector data includes data defining a sparsity pattern of the second input submatrix that indicates a position of a non-zero element within the second submatrix.

In some aspects, the selector data indicates a first sub-multiplication to which the first input submatrix belongs. The selector data can indicate a second sub-multiplication to which the second input submatrix belongs. When the first sub-multiplication matches the second sub-multiplication, the controller can select the given accumulator corresponding to the first sub-multiplication and the second sub-multiplication. When the first sub-multiplication does not match the second sub-multiplication, the controller disables a write input to all of the multiple accumulators.

In some aspects, each accumulator of the multiple accumulators accumulates values output by the summation circuitry for a given set of input matrices.

The subject matter described in this specification can be implemented in particular embodiments so as to realize one or more of the following advantages. The systolic array cells described in this document can include multiple accumulators and a controller circuit, which enables the cells to perform a variety of different matrix multiplication computations. This provides additional flexibility within a systolic array and increases the efficiency of matrix computations using less hardware. For example, the use of the controller circuit and the multiple accumulators can enable operations performed on sparse matrices to be performed faster and more efficiently than performing the operations on dense matrices directly. The controller circuit and the multiple accumulators also enable the cells to perform matrix computations on different sparsity patterns, e.g., 1-of-n patterns with submatrices and tile sharing.

Various features and advantages of the foregoing subject matter are described below with respect to the figures. Additional features and advantages are apparent from the subject matter described herein and the claims.

BRIEF DESCRIPTION OF THE DRAWINGS

Like reference numbers and designations in the various drawings indicate like elements.

DETAILED DESCRIPTION

Figure 1:
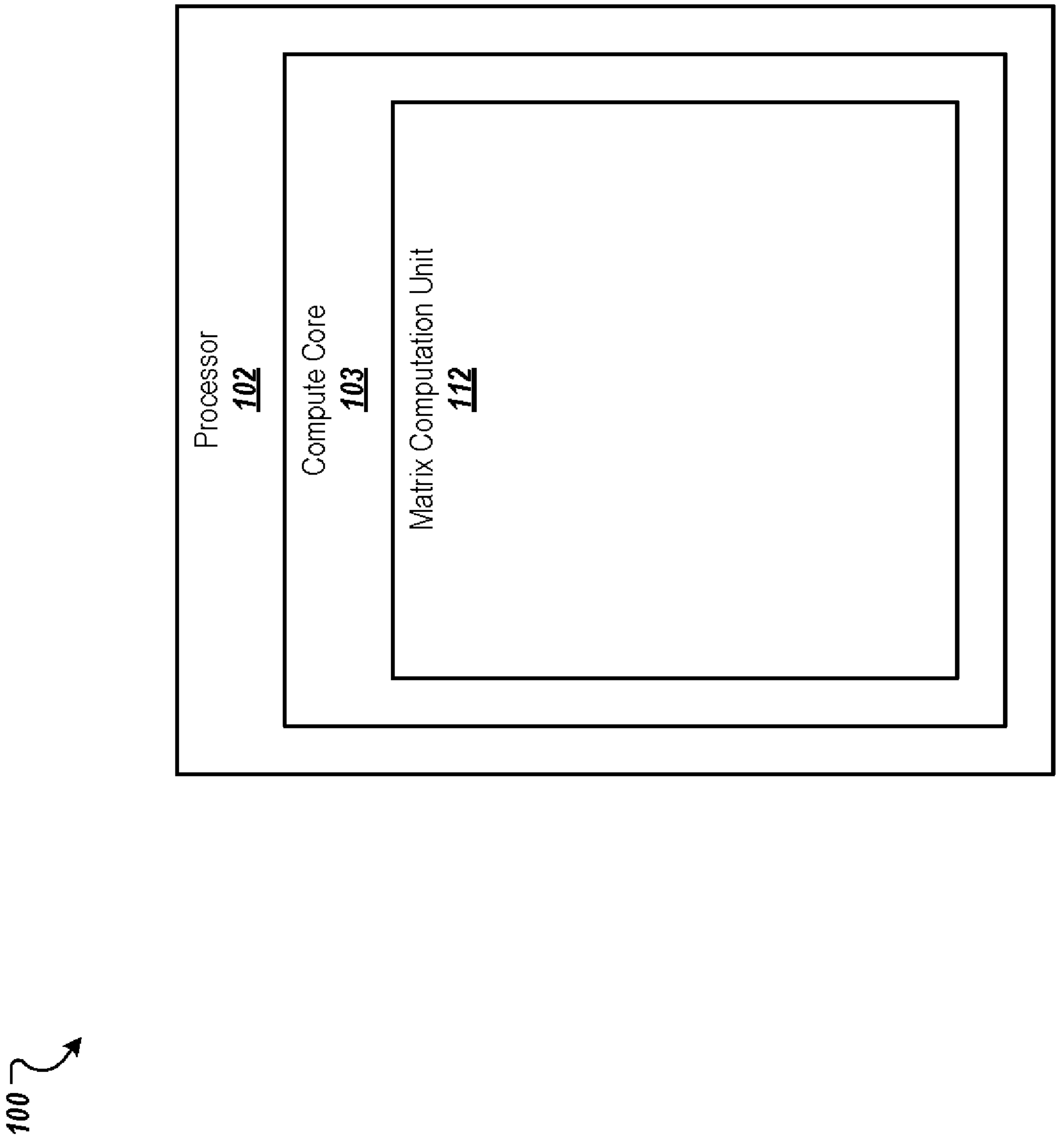
FIG. 1 shows an example processing system that includes a matrix computation unit.

In general, this document describes systolic arrays of cells that include multiple accumulators. The cells can include computation units, e.g., multiplication and/or addition circuitry, for performing computations. For example, a systolic array can perform matrix-matrix multiplication on input matrices and each cell can determine a partial matrix product of a portion of each input matrix. A systolic array of cells can be part of a matrix computation unit of a processing system, e.g., a special-purpose machine learning processor used to train machine learning models and/or perform machine learning computations, a graphics processing unit (GPU), or another appropriate processing system that performs matrix multiplications.

The systolic array can perform an output stationary matrix multiplication technique in which each cell computes a partial sum of products of a portion of elements of the input matrices. In an output stationary technique, elements of the input matrices can be shifted in opposite, or orthogonal, directions across rows, or across columns, of the systolic array. Each time a cell receives two submatrices, the cell determines a product of the submatrices and accumulates a partial sum of all of the products determined by the cell for its portion of the two input submatrices.

The systolic array cells can include a controller, e.g., a control circuit, and multiple accumulators that enable the systolic arrays to support various matrix operations, such as operations on different matrices having different sparsity patterns. The sparsity pattern indicates the number of non-zero elements within a matrix, and can be denoted as an x-of-y sparsity pattern where x is the maximum number of non-zero elements and y is the total number of elements. For example, a 1-of-4 sparsity pattern can indicate that a matrix includes four elements, with at most one of the elements being non-zero. The controller can control which accumulator a product is accumulated at based on selector data received by the cell. For example, the selector data can include sparsity data of a submatrix and data identifying a non-zero element in the submatrix. Based on this data, the controller can enable one of the accumulators to accumulate the product of the non-zero element and another matrix element.

The systolic arrays are adapted to more efficiently handle sparse matrices when training machine learning models and performing machine learning computations, resulting in faster training and computations using less computational resources than performing the same or similar computations on dense matrices directly. The inclusion of multiple accumulators and control circuitry provides the flexibility to dynamically handle matrices having different sparsity patterns efficiently without having to adjust the hardware of the systolic arrays. Instead, the control circuit and control inputs can be used to select the appropriate accumulator for each computation based on the sparsity pattern of the input matrices, which provides the dynamic flexibility to more efficiently handle the different sparsity patterns.

FIG. 1 shows an example processing system 100 that includes a matrix computation unit 112. The system 100 is an example of a system in which a matrix computation unit 112 that has a systolic array of cells that have multiple accumulators can be implemented.

The system 100 includes a processor 102, which can include one or more compute cores 103. Each compute core 103 can include a matrix computation unit 112 that can be used to perform matrix-matrix multiplication using a systolic array of cells that have multiple accumulators. The system 100 can be in the form of a special-purpose hardware chip.

In some implementations, the compute core 103, or another component thereof, can send matrices to the matrix computation unit 112 along with control information. The control information can define the operations to be performed by the matrix computation unit 112. The control information can also define or otherwise control the data flow through a systolic array of the matrix computation unit 112. For example, the control information can define whether individual elements or submatrices of each input matrix are to be shifted through the systolic array. In the case of submatrices, the control information can define the dimensions of the submatrices, e.g., 2×2, 2×4, etc., the sparsity patterns of the submatrices when appropriate, and/or the non-zero element of each submatrix. A submatrix having a single element, e.g., a 1×1 submatrix, that is a part of a larger input matrix can also be referred to as a matrix element. The information defining the sparsity pattern and the non-zero element for each submatrix can be shifted through the systolic array, e.g., along with the submatrices, as described in more detail below.

Each matrix computation unit 112 can be used to perform matrix multiplication computations during the training or use of a machine learning model. For example, matrix multiplication is a common computation performed during the training and use of deep learning models, such as deep neural network models. The systolic array of the matric computation unit 112 is adapted to more efficiently handle sparse matrices when training machine learning models and performing machine learning computations, resulting in faster training and computations using less computational resources than performing the same or similar computations on dense matrices. Aggregated across the many matrix computations of a deep learning model, this results in substantial performance improvements.

Figure 2:
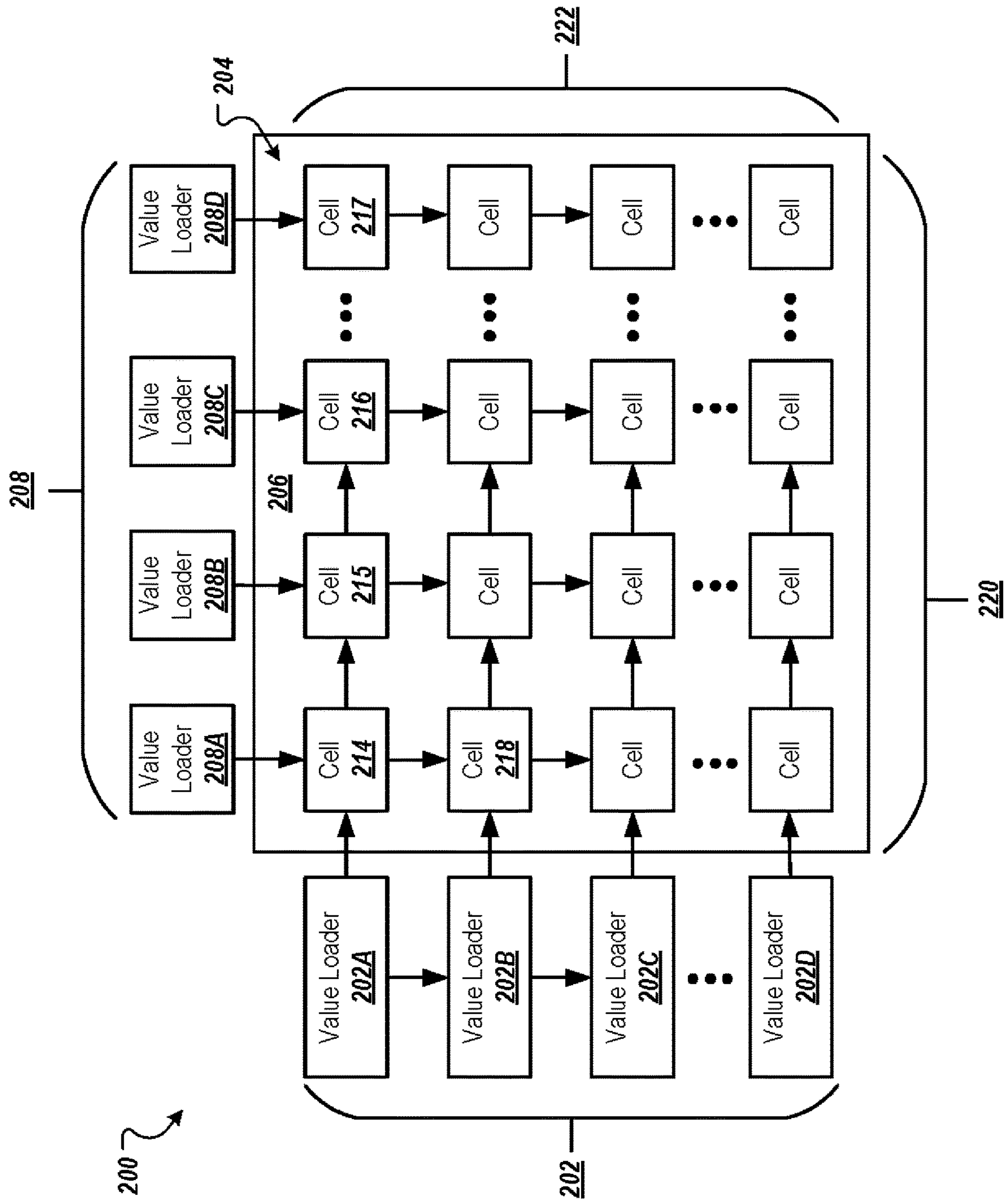
FIG. 2 shows an example architecture including a matrix computation unit.

FIG. 2 shows an example architecture including a matrix computation unit. The matrix computation unit is a two-dimensional systolic array 206. The two-dimensional systolic array 206 can be a square array. The array 206 includes multiple cells 204. In some implementations, a first dimension 220 of the systolic array 206 corresponds to columns of cells and a second dimension 222 of the systolic array 206 corresponds to rows of cells. The systolic array 206 can have more rows than columns, more columns than rows, or an equal number of columns and rows. Thus, the systolic array 206 can have shapes other than a square. The matrix computation unit 112 of FIG. 1 can be implemented as the systolic array 206.

The systolic array 206 can be used for matrix multiplication or other computations, e.g., convolution, correlation, or data sorting. For example, the systolic array 206 can be used for neural network computations.

The systolic array 206 includes value loaders 202 and value loaders 208. The value loaders 202 can send submatrices to rows of the array 206 and the value loaders 208 can send submatrices to columns of the array. In some other implementations, however, the value loaders 202 and 208 can send submatrices to opposite sides of the columns of the systolic array 206. In another example, the value loaders 202 can send submatrices across the rows of the systolic array 206 while the value loaders send submatrices across the columns of the systolic array 206, or vice versa. In a neural network example, the value loaders 202 can send activation inputs to rows (or columns) of the array 206 and the value loaders 208 can send weight inputs to rows (or columns) of the array 206 from an opposite side (or orthogonal side) from that of the value loaders 202. In yet another example, the value loaders 202 can send the activation inputs diagonally across the array 206 and the value loaders 208 can send weight inputs diagonally across the array 206, e.g., in an opposite direction than that of the value loaders 202 or in a direction orthogonally to the direction of the value loaders 202.

The value loaders 202 can receive the submatrices from a unified buffer or other appropriate source. Each value loader 202 can send a corresponding submatrix to a distinct left-most cell of the array 206. The left-most cell can be a cell along a left-most column of the array 206. For example, value loader 202A can send a submatrix to cell 214. The value loader 202A can also send the submatrix to an adjacent value loader, and the submatrix can be used at another left-most cell of the array 206. This allows submatrices to be shifted for use in another particular cell of the array 206.

The value loaders 208 can also receive submatrices from a unified buffer or other appropriate source. Each value loader 208 can send a corresponding submatrix to a distinct top-most cell of the array 206. The top-most cell can be a cell along a top-most row of the array 206. For example, value loader 208A can send a submatrix to cell 214. The value loader 208A can also send the submatrix to an adjacent value loader, and the submatrix can be used at another top-most cell of the array 206. This allows submatrices to be shifted for use in another particular cell of the array 206.

In some implementations, a host interface shifts submatrices (e.g., activation inputs) throughout the array 206 along one dimension, e.g., to the right, while shifting submatrices (e.g., weight inputs) throughout the array 206 along an orthogonal dimension, e.g., down. For example, over one clock cycle, the submatrix (activation input) at cell 214 can shift to a register in cell 215, which is to the right of cell 214. Similarly, the submatrix (e.g., weight input) at cell 214 can shift to a register at cell 218, which is below cell 215. In other examples, the weight inputs can be shifted in an opposite direction (e.g., from right to left) than that of the activation inputs.

The value loaders 202 and 208 can also send selector data with each submatrix that they send to the array 206. When used in sparse matrix applications, the selector data can include sparsity data that defines the sparsity pattern of the submatrix. In such applications, only one of the elements of the submatrix can have a non-zero value. The sparsity pattern can indicate the location of one element that can have a non-zero value in the submatrix. This data can be included with the selector data because the element that is capable of having a non-zero value in the submatrix may nonetheless have a value of zero.

To determine a product of two matrices, e.g., one representing activation inputs and one representing weights, using an output-stationary technique, each cell accumulates a sum of products of matrix elements shifted into the cell. On each clock cycle, each cell can process a given weight input and a given activation input to determine a product of the two inputs. The cell can add each product to an accumulated value maintained by an accumulator of the cell. For example, the cell 215 can determine a first product of two matrix elements, e.g., a first activation input and a first weight input, and store the product in the accumulator. The cell 215 can shift the activation input to the cell 216 and shift the weight input to cell 218. Similarly, the cell 215 can receive a second activation input from cell 214 and a second weight input from value loader 208B. The cell 215 can determine the product of the second activation input and the second weight input. The cell 215 can add this to the previous accumulated value to generate an updated accumulated value.

For sparsity, tile sharing, and other applications, the cells can accumulate values in each of multiple accumulators of the cells. For each pair of submatrices received by a cell, the cell can determine a product of the two submatrices and store the product in one of the accumulators. A controller of each cell can select an appropriate accumulator based on the selector data shifted into the cell with the submatrices, as described in more detail below.

After all of the matrix elements have been passed through the rows of the systolic array, each cell can shift out its accumulated value as a partial result of the matrix multiplication. These accumulated values can then be used for further computations during the training or use of a machine learning model. An example individual cell is described further below with reference to FIG. 3.

The cells can pass, e.g., shift, the output along their columns, e.g., towards the bottom of the column in the array 206. In some implementations, at the bottom of each column, the array 206 can include accumulator units that store and accumulate each output from each column. The accumulator units can accumulate each output of its column to generate a final accumulated value. The final accumulated value can be transferred to a vector computation unit or another appropriate component.

The cells 204 of the systolic array 206 can be hardwired to adjacent cells. For example, the cell 215 can be hardwired to the cell 214 and to the cell 216 using a set of wires. In some implementations, when shifting output data out from a cell to an accumulator unit, the cell can output a numerical value in a single clock cycle. To do so, the cell can have an output wire for each bit of a computer number format used to represent the output value. For example, if the output value is represented using a 32-bit floating point format, e.g., float32 or FP32, the cell can have 32 output wires to shift out the entire output value in a single clock cycle.

In some cases, the input to computation units and/or to an accumulator of a cell has a lower precision than the internal precision of the computation unit and/or accumulator. For example, the floating point values of an input matrix can be 16-bit, e.g., in bfloat16 or BF16 format. However, the multiplication circuitry, summation circuitry, and/or accumulator can operate on higher precision numbers, e.g., FP32 numbers. In this example, the output of the accumulator of an upstream cell can be an FP32 number. Thus, to output the FP32 number in one clock cycle, the upstream cell can have 32 output wires to the downstream cell. The cells 204 can work with other number formats having other levels of precision.

Figure 3:
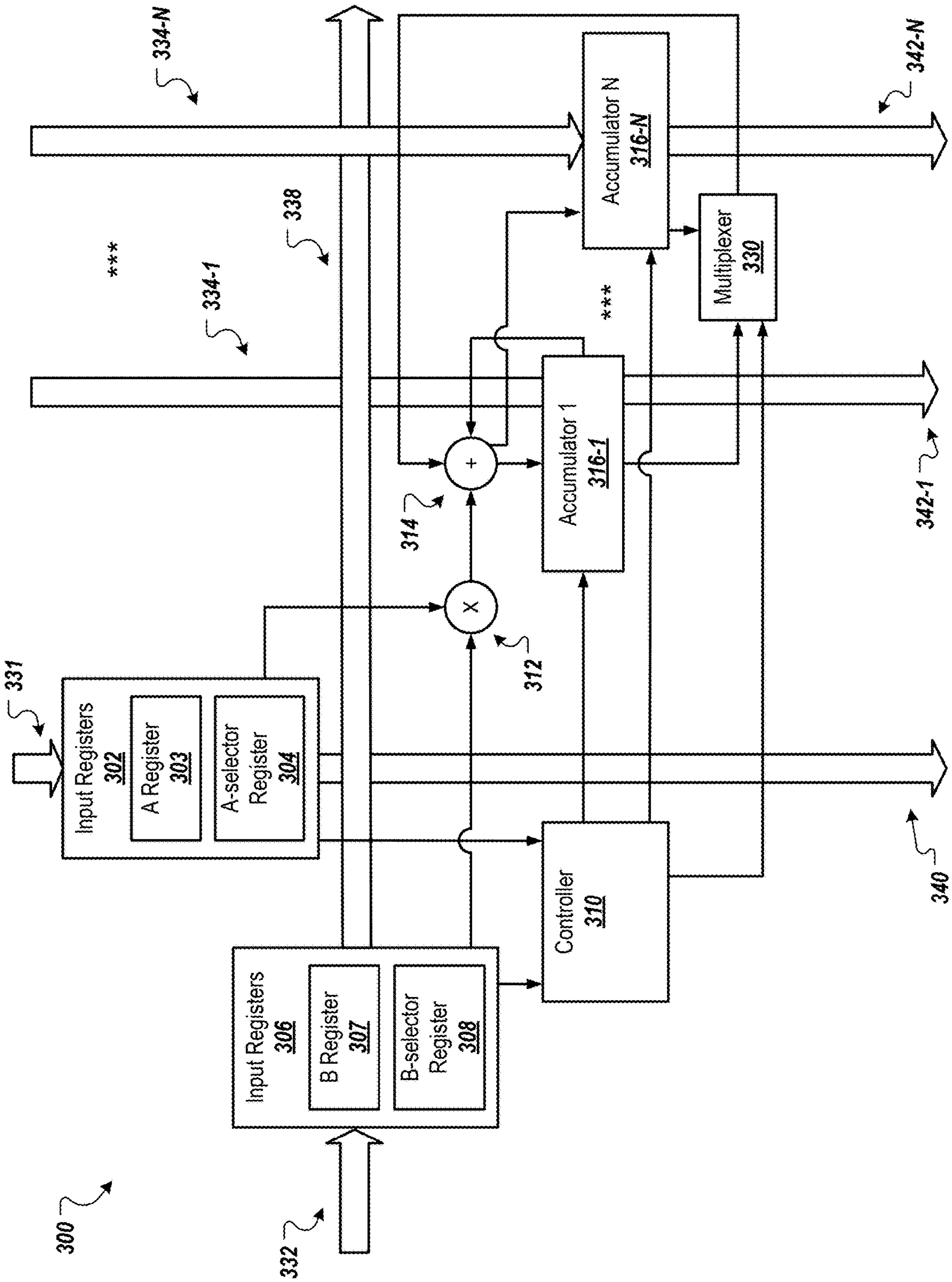
FIG. 3 shows an example architecture of a cell inside a systolic array.

FIG. 3 shows an example architecture 300 of a cell inside a systolic array. For example, the cells 204 of the systolic array 206 of FIG. 2 can be implemented using the architecture 300. The cells can be used to perform matrix-matrix multiplication of two input matrices. Although the cells will be described in terms of performing the matrix-matrix multiplication, the cells can be used to perform other computations, e.g., convolution, correlation, or data sorting.

The cell can include input registers, including input registers 302 and input registers 306. The input registers 302 include an A register 303 and an A-selector register 304. The A register 302 receives submatrices of an input matrix from a right adjacent cell (e.g., an adjacent cell located to the right of the given cell) or from another component (e.g., a value loader 208 if used in the systolic array 206 of FIG. 2) depending on the position of the cell within the systolic array. The A-selector register 304 is a selector register that receives selector data for each received submatrix from the right adjacent cell or the value loader 208, depending on the position of the cell within the systolic array. In a neural network implementation, the A register 303 can receive submatrices of a weight input matrix. The submatrices and selector data are received via a bus 331, which can include one or more wires.

The input registers 306 include a B register 307 and a B-selector register 308. The B register 307 receives submatrices of an input matrix from a left adjacent cell (e.g., an adjacent cell located to the left of the given cell) or from another component (e.g., a value loader 202 if used in the systolic array 206 of FIG. 2) depending on the position of the cell within the systolic array. The B-selector register 308 is a selector register that receives selector data for each received submatrix from the left adjacent cell or the value loader 202, depending on the position of the cell within the systolic array. In a neural network implementation, the B register 307 can receive submatrices of an activation input matrix. The submatrices and selector data are received via a bus 332, which can include one or more wires. During the training and use of machines learning models, such as neural networks, activation inputs can be multiplied by corresponding weights, which can be in the form of matrices.

The cell 300 includes multiplication circuitry 312, summation circuitry 314, a controller 310, N accumulators 316-1-316-N, where N is an integer greater than or equal to two, and a multiplexer 330, each of which can be implemented in hardware circuitry. The multiplexer 330 is optional and can be excluded depending on the application for the systolic array that includes the cell 300.

In general, the multiplication circuitry 312 can determine products of submatrices stored in the registers 303 and 306. The summation circuitry 314 can determine a sum of the product and a current accumulated value of one of the accumulators 316 and send the sum to the one accumulator 316 for storage.

The controller 310 can select the accumulator 316 to which a product should be added based on selector data of the A-selector register 304 and/or selector data of the B-selector register 308. Examples of how the selector data is used to select the accumulator based on selector data are provided below. In either case, the controller 310 can set write enables of the selected accumulator 316 to enable writing from the summation circuitry 314. For example, the controller 310 set the write enables of the selected accumulator 316 to enable writing from the summation circuitry 314 for the clock cycle corresponding to the summation operation.

In some implementations, the cell 300 can include a single selector register or more than two selector registers. For example, one or more selector registers can receive the selector data for use by the controller 310.

Similarly, to enable the summation circuitry to add the product to the selected accumulator's current accumulated value, the controller 310 can set the multiplexer's selector values such that the multiplexer 330 passes the current value of the selected accumulator 316 as an input to the summation circuitry 314.

After the multiplication is complete for all elements of the input matrices, each accumulator 316 can shift its accumulated value out of the cell 300. In some implementations, as shown in FIG. 3, each accumulator 316 has a respective bus 334-1-334-N to shift its accumulated value from the cell 300. In some implementations, the multiplexer 330 or another multiplexer can be used to shift each output from the cell 300 on one bus, e.g., one at a time.

The cell also includes buses for shifting matrix elements in from other cells and out to other cells. For example, the cell includes the bus 332 for receiving matrix elements from a left adjacent cell and a bus 338 for shifting matrix elements to a right adjacent cell. Similarly, the cell includes the bus 331 for receiving matrix elements from a top adjacent cell and a bus 340 for shifting matrix elements to a bottom adjacent cell. The cell also includes buses 334-1-334-N for receiving accumulated values from a top adjacent cell and buses 342-1-342-N for shifting accumulated values to a bottom adjacent cell. Each bus can be implemented as a set of wires.

Systolic arrays that include the cell 300 can be used in a variety of matrix computation applications. In these applications, multiple passes over variants of the same input matrices can be used to handle denser matrices. For example, a matrix with a 2-of-4 sparsity pattern can be split into the sum of two matrices with 1-of-4 sparsity patterns and those subparts processed separately by the cells of the systolic array. In another example, a matrix with a 2-of-4 sparsity pattern can be split into two matrices with 1-of-3 sparsity patterns with appropriate shifting and addition of the results to produce the combined result. In another example, the size of one or both matrices can be increased to increase their sparsity to fit a pattern and the other matrix can be adjusted to produce the same result as for unwidened inputs.

One example application is basic sparsity. In this application, a matrix is split into k-by-1 or 1-by-k blocks with at most one non-zero element in each block, i.e., a 1-of-k sparsity pattern. In this example, if only one matrix is sparse and the other is dense, only one of the A-selector register 304 or the B-selector register 308 has to be used. This can reduce the amount of data that needs to be sent to the systolic array and reduce the number of control operations performed by the systolic array, resulting in faster, more efficient computations. One example is multiplying a matrix A of k-by-1 blocks with 1-of-k sparsity with a dense matrix B (1-by-1 blocks with trivial 1-of-1 sparsity). In this example, the output can be built from k-by-1 blocks as well, with one block per array cell and one element of the block per accumulator 316. That is, if the blocks are 3-by-1 blocks, three accumulators 316 can be used, with one for each of the three elements. The position of the non-zero element in A can be encoded using the selector data shifted into the A-selector register 304 and this value can directly encode to which accumulator to add the multiplication result.

In this example, each time a new 1-by-k block is shifted into the A register 303 and a new 1-by-1 block is shifted into the B register 307, the controller 310 can use the selector data to identify the non-zero value and select its corresponding accumulator 316. The controller 310 can then set the write enables of the selected accumulator 316 and the selector values of the multiplexer 330 such that the summation circuitry 314 adds the product to the current accumulated value of the selected accumulator 316 and the sum is stored in the selected accumulator 316. The 1-by-k blocks can be shifted along the rows from the value loaders 208 and the 1-by-1 blocks can be shifted along the rows from the value loaders 202.

Another example application is sparsity within blocks in which a single A or B input element represents a small submatrix with at most one non-zero element. The selector data of the A-selector register 304 and the B-selector register 308 would then indicate which element is non-zero. For example, each element could be a 2-by-2 submatrix. The product of two submatrices can be computed with at most one scalar product and is either another submatrix of the same form or all zero. Each cell 300 then represents an output submatrix with one element in each of its accumulators 316. In particular, if A represents a submatrix with value x at position (ar, ac) and B represents a submatrix with a value y at position (br, bc), the result is zero if ac≠br and is a submatrix with value x*y at position (ar, bc) otherwise. This can be used by the controller 310 to set the multiplexer's selector values and the accumulators' write enables to add this resulting submatrix into the cell's current values.

By adapting the different sparsity patterns, the systolic arrays can perform matrix computations more efficiently. For example, this can ensure that computations are only performed on non-zero values (or at least reduce the number of computations involving zero values) without having to adjust the matrices being input to the systolic array.

Another example application is tile sharing in which multiple smaller multiplications are run within the same larger array. For example, each matrix element in the A and B matrices can be assigned a particular sub-multiplication, with each sub-multiplication going into a different accumulator 316. The selector data of the A-selector register 304 and the B-selector register 308 is used to tag each element of A and B with the sub-multiplication to which the element belongs. If the A and B elements stored in the registers 303 and 307, respectively, do not belong to the same sub-multiplication, the write enables of the accumulators 316 can be disabled by the controller 310. Absent multiple accumulators within the same cell, such tile sharing would not be possible without using multiple cells to perform each sub-multiplication. The use of multiple accumulators in the same cell and the control circuitry for enabling/disabling accumulators therefore reduces the amount of computational resources (e.g., the number of cells) required to perform the same operations and can result in significant speed and other performance advantages relative to single accumulator cells.

For example, the controller 310 can determine, for each pair of elements shifted into the registers 303 and 307, which sub-multiplication to which the two elements belong. If the elements belong to the same sub-multiplication, the controller 310 can set the write enables of the accumulators 316 such that the accumulator 316 corresponding to the sub-multiplication is enabled and the write enables of the other accumulators are disabled. The controller 310 can also set the selector values for the multiplexer such that the summation circuitry 314 adds the product to the current accumulated value of the corresponding accumulator 316. If the two elements belong to different sub-multiplications, the controller 310 can disable the write enables to all of the accumulators 316. With additional logic, it is possible for the same matrix elements to be shared between sub-multiplications.

The controller 310 can be configurable to handle the various applications, e.g., based on control signals received from a core or other component. The controller 310 can also perform matrix computations for dense matrices using a single accumulator, e.g., by not using selector data of the A-selector register 304 or the B-selector register 308 and sending the sum of the product and current accumulator value of the single accumulator back to the single accumulator. The use of the controller 310 in combination with the multiple accumulators 316 provide the flexibility to handle each application in the most efficient way for the various applications without requiring hardware changes.

Figure 4:
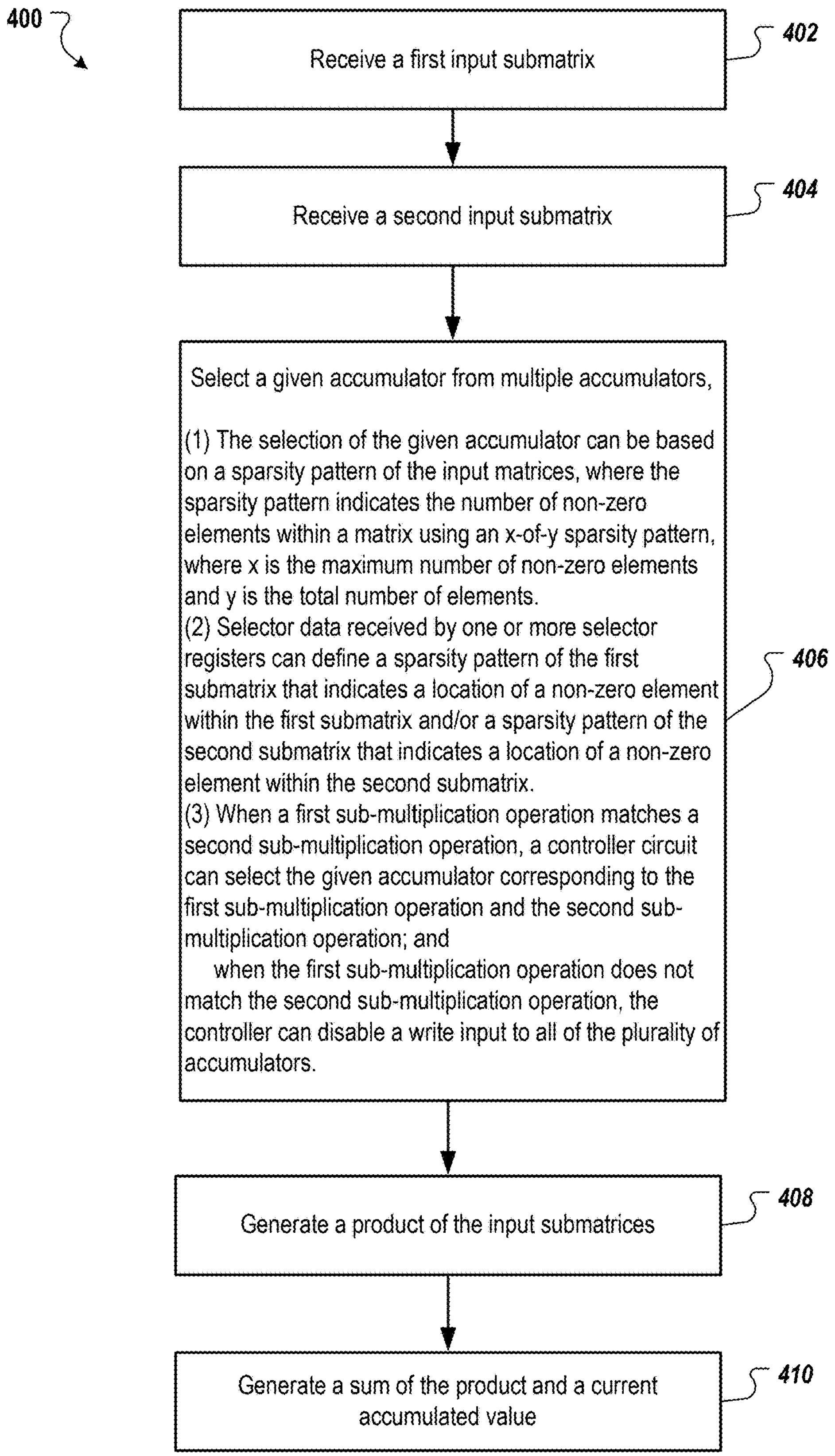
FIG. 4 is a flow diagram of an example process for performing matrix multiplication.

FIG. 4 is a flow diagram of an example process 400 for performing matrix multiplication. The process 400 can be performed by each of one or more cells of a systolic array of a multiplication unit. The process 400 can be performed multiple times by each cell and the result(s) calculated by each cell can be used to determine a final matrix multiplication result.

A first input register of a cell receives a first input submatrix (402). For example, the A register 303 of the cell 300 can receive the first input submatrix. The first input submatrix can represent a weight input. Along with the first input submatrix, a first selector register, e.g., the A-selector register 304, can receive first selector data. The first selector data can, for example, define a sparsity of the first input submatrix and the location of a non-zero element in the first input submatrix. In another example, the first selector data can indicate a first sub-multiplication to which the first input submatrix belongs.

A second input register of the cell receives a second input submatrix (404). For example, the B register 307 of the cell 300 can receive the second input submatrix. The second input submatrix can represent an activation input. Along with the second input submatrix, a second selector register, e.g., the B-selector register 308, can receive second selector data. The second selector data can, for example, define a sparsity of the second input submatrix and the location of a non-zero element in the second input submatrix. In another example, the second selector data can indicate a second sub-multiplication to which the second input submatrix belongs.

A controller of the cell selects one or more accumulators from multiple accumulators of the cell (406). The controller can select the one or more accumulators based on the first selector values and/or the second selector values. For example, if the selector data defines a sparsity and location of a non-zero element for one of the input submatrices, the controller can select the accumulator(s) corresponding to the non-zero element. The controller can enable the write inputs to the selected accumulator. The controller can use multiple accumulators to share the same multiplier, e.g., multiplication circuit, between multiple adders, e.g., summation circuits.

If the first selector data indicates a first sub-multiplication to which the first input submatrix belongs and the second selector data indicates a second sub-multiplication to which the second input submatrix belongs, the controller can determine whether the first sub-multiplication matches the second sub-multiplication. If so, the controller can select the accumulator corresponding to the matching sub-multiplication and enable the write inputs to the selected accumulator. If not, the cell may not perform a multiplication and the controller can disable the write inputs to all of the accumulators.

Multiplication circuitry of the cell determines a product of the first input submatrix and the second input submatrix (408). For example, the multiplication circuitry can perform matrix-matrix multiplication by multiplying, one at a time, corresponding elements of the first input submatrix by corresponding elements of the second input submatrix.

Summation circuitry of the cell determines a sum of the product and a current accumulated value of the selected accumulator (410). For example, the controller can set selector values for a multiplexer arranged between the outputs of the accumulators and the input to the summation circuitry such that the output of the selected accumulator is passed to the input of the summation circuitry. The sum can be sent to the selected accumulator for storage.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory program carrier for execution by, or to control the operation of, data processing apparatus. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array), an ASIC (application specific integrated circuit), or a GPGPU (General purpose graphics processing unit).

Computers suitable for the execution of a computer program include, by way of example, can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

The invention claimed is:

1. A matrix computation unit, comprising a plurality of cells arranged in a systolic array, wherein each cell comprises:

multiplication circuitry configured to determine a product of elements or submatrices of input matrices;

summation circuitry configured to determine a sum of an input accumulated value and the product output by the multiplication circuitry;

a plurality of accumulators connected to an output of the summation circuitry; and a controller circuit configured to select, from the plurality of accumulators, a given accumulator to receive the sum output by the summation circuitry, wherein the selection of the given accumulator is based on a sparsity pattern of the input matrices, wherein the sparsity pattern indicates the number of non-zero elements within a matrix using an x-of-y sparsity pattern, where x is the maximum number of non-zero elements and y is the total number of elements.

2. The matrix computation unit of claim 1, wherein the controller circuit is configured to select the given accumulator for each of multiple products determined by the multiplication circuitry based on selector data received by the cell, the selector data including data representing the sparsity pattern.

3. The matrix computation unit of claim 1, wherein:

each cell further comprises a first input register configured to receive a first submatrix and a second input register configured to receive a second submatrix; and the product determined by the multiplication circuitry comprises a product of the first submatrix and the second submatrix.

4. The matrix computation unit of claim 3, wherein:

each cell further comprises one or more selector registers configured to receive selector data; and the controller circuit is configured to select the given accumulator for each of multiple products determined by the multiplication circuitry based on the selector data, the selector data including data representing the sparsity pattern.

5. The matrix computation unit of claim 4, wherein:

the selector data comprises data defining a sparsity pattern of the first submatrix that indicates a location of a non-zero element within the first submatrix; and/or the selector data comprises data defining a sparsity pattern of the second submatrix that indicates a location of a non-zero element within the second submatrix.

6. The matrix computation unit of claim 4, wherein:

the selector data indicates a first sub-multiplication operation that takes the first submatrix as input;

the selector data indicates a second sub-multiplication operation that takes the second submatrix as input; and when the first sub-multiplication and the second sub-multiplication produce a partial product, the controller circuit is configured to select the given accumulator corresponding to the first sub-multiplication operation and the second sub- multiplication operation; and when the first sub-multiplication and the second sub-multiplication does not produce a partial product, the controller is configured to disable a write input to all of the plurality of accumulators.

7. The matrix computation unit of claim 1, wherein an accumulator of the plurality of accumulators stores a sum of values output by the summation circuitry for a given set of input matrices.

8. A data processing cell, comprising:

multiplication circuitry configured to determine a product of submatrices of input matrices;

summation circuitry configured to determine a sum of an input accumulated value and the product output by the multiplication circuitry;

a plurality of accumulators connected to an output of the summation circuitry; and a controller circuit configured to select, from the plurality of accumulators, a given accumulator to receive the sum output by the summation circuitry, wherein the selection of the given accumulator is based on a sparsity pattern of the input matrices, wherein the sparsity pattern indicates the number of non-zero elements within a matrix using an x-of-y sparsity pattern, where x is the maximum number of non-zero elements and y is the total number of elements.

9. The data processing cell of claim 8, wherein the controller circuit is configured to select the given accumulator for each of multiple products determined by the multiplication circuitry based on selector data received by the data processing cell, the selector data including data representing the sparsity pattern.

10. The data processing cell of claim 8, further comprising a first input register configured to receive a first submatrix and a second input register configured to receive a second submatrix, wherein the product determined by the multiplication circuitry comprises a product of the first submatrix and the second submatrix.

11. The data processing cell of claim 10, further comprising one or more selector registers configured to receive selector data, wherein the controller circuit is configured to select the given accumulator for each of multiple products determined by the multiplication circuitry based on the selector data, the selector data including data representing the sparsity pattern.

12. The data processing cell of claim 11, wherein:

the selector data comprises data defining a sparsity pattern of the first submatrix that indicates a location of a non-zero element within the first submatrix; and/or the selector data comprises data defining a sparsity pattern of the second submatrix that indicates a location of a non-zero element within the second submatrix.

13. The data processing cell of claim 11, wherein:

the selector data indicates a first sub-multiplication operation that takes the first submatrix as input;

the selector data indicates a second sub-multiplication operation that takes the second submatrix as input; and when the first sub-multiplication and the second sub-multiplication produce a partial product, the controller is configured to select the given accumulator corresponding to the first sub-multiplication operation and the second sub-multiplication operation; and when the first sub-multiplication and the second sub-multiplication does not produce a partial product, the controller is configured to disable a write input to all of the plurality of accumulators.

14. The data processing cell of claim 8, wherein an accumulator of the plurality of accumulators stores a sum of values output by the summation circuitry for a given set of input matrices.

15. A method for multiplying matrices, the method comprising:

receiving, by a first input register of a cell, a first input submatrix;

receiving, by a second input register of the cell, a second input submatrix;

selecting, by a controller of the cell, a given accumulator from a plurality of accumulators of the cell to receive a sum of (i) a product of the first input submatrix and the second input submatrix and (ii) a current accumulated value of the given accumulator, wherein the selection of the given accumulator is based on a sparsity pattern of the input submatrices, wherein the sparsity pattern indicates the number of non-zero elements within a matrix using an x-of-y sparsity pattern, where x is the maximum number of non-zero elements and y is the total number of elements;

generating, by multiplication circuitry of the cell, a product of the first input submatrix and the second input submatrix;

generating, by summation circuitry of the cell, an updated accumulated value by adding the product of the first input submatrix and the second input submatrix to the current accumulated value; and storing the updated accumulated value in the given accumulator.

16. The method of claim 15, wherein the product determined by the multiplication circuitry comprises a product of the first input submatrix and the second input submatrix.

17. The method of claim 15, further comprising receiving, by one or more selector registers of the cell, selector data, wherein selecting the given accumulator comprises selecting the given accumulator based on the selector data, the selector data including data representing the sparsity pattern.

18. The method of claim 17, wherein:

the selector data comprises data defining a sparsity pattern of the first input submatrix that indicates a location of a non-zero element within the first input submatrix; and/or the selector data comprises data defining a sparsity pattern of the second input submatrix that indicates a location of a non-zero element within the second input submatrix.

19. The method of claim 17, wherein:

the selector data indicates a first sub-multiplication operation that takes the first input submatrix as input;

the selector data indicates a second sub-multiplication operation that takes the second input submatrix as input; and when the first sub-multiplication and the second sub-multiplication produce a partial product, the controller selects the given accumulator corresponding to the first sub-multiplication operation and the second sub-multiplication operation; and when the first sub-multiplication operation and the second sub-multiplication does not produce a partial product, the controller disables a write input to all of the plurality of accumulators.

20. The method of claim 15, wherein an accumulator of the plurality of accumulators stores a sum of values output by the summation circuitry for a given set of input matrices.

* * * * *